United States Patent [19]

Schleicher

[11] 4,149,450

[45] Apr. 17, 1979

[54] ARRANGEMENT FOR WORKING CYLINDERS

[75] Inventor: Hermann J. Schleicher, Erlangen-Rathsberg, Fed. Rep. of Germany

[73] Assignee: Cis Metalform Maschinen GmbH, Fed. Rep. of Germany

[21] Appl. No.: 800,348

[22] Filed: May 25, 1977

[30] Foreign Application Priority Data

Jul. 6, 1976 [DE] Fed. Rep. of Germany ....... 2630226

[51] Int. Cl.[2] .......................... F15B 15/24; F16J 1/12

[52] U.S. Cl. ...................................... 91/466; 92/13.1; 92/129; 92/140; 425/451.6

[58] Field of Search .................... 92/13.1, 76, 29, 140, 92/129; 91/391 A, 466; 425/451.6, 451.5, 592, 593, 595, DIG. 221, DIG. 220, DIG. 222

[56] References Cited

U.S. PATENT DOCUMENTS

| | | | |
|---|---|---|---|
| 2,969,818 | 1/1961 | Allard | 425/DIG. 220 |
| 3,143,930 | 8/1964 | Ayers, Jr. | 91/391 A |
| 3,179,981 | 4/1965 | Grouesen | 425/DIG. 222 |
| 3,303,751 | 2/1967 | Bratten | 91/391 A |
| 3,327,622 | 6/1967 | Lebovitz | 425/DIG. 220 |
| 3,443,521 | 5/1969 | Stender | 92/13.1 |
| 3,712,774 | 1/1973 | Parker | 425/DIG. 222 |
| 3,760,696 | 9/1973 | Florjancic | 92/129 |

*Primary Examiner*—Paul E. Maslousky
*Attorney, Agent, or Firm*—Jacobs & Jacobs

[57] ABSTRACT

In working cylinders whose power stroke can be shifted to different operating positions in two consecutive steps, the invention provides a control cylinder which is actuated independently of the generation of working pressure. The control cylinder acts on a joint lever which alters the distance between two separate parts of the power transmission to the tool and thus the effective length of the transmission. This arrangement has the advantage of small working volumes and low energy consumption.

5 Claims, 4 Drawing Figures

ARRANGEMENT FOR WORKING CYLINDERS

This invention relates to an arrangement for working cylinders whose power stroke can be shifted to different operating positions in consecutive steps. Such working cylinders, actuated by hydraulic or pneumatic means, are preferably used for non cutting forming, e.g. punching, embossing and coining, of metallic substrates. They are also applied for stepwise control of processes.

It is known in the art to provide the working cylinder with suitable stops or valves to bring the piston to a rest after it has moved over a specific distance. Furthermore, working cylinders with several pistons and twin working cylinders with interconnected piston rods have been described. These known equipments have the disadvantage of rather expensive construction and need large amounts of energy.

It is the main object of the present invention to overcome these disadvantages and to provide a working cylinder with a working volume which is unvarying and as small as possible, thus consulting a relatively small amount of energy. The piston is to execute only the power stroke while the shifting of the operating position is effected separately from the working cylinder and with very small amounts of pressure fluid, preferably under low pressure.

To attain these features and advantages, the invention provides a power transmission having two aligned parts, and control means actuated independently of the working cylinder and acting on lever means adapted to separate said two parts and thus change the effective length of said power transmission. Said control means comprising a control cylinder which is independent of the generation of working force. The control cylinder actuates a joint lever which alters, according to its bent or stretched position, the effective length of the power transmission of the working cylinder and thus shifts the operating position. The power transmission consists of two separate parts, and the outer end of the joint lever are pivoted to one of the parts, respectively. The two parts may be constituted by the piston rod of the working cylinder on one side and a working plate or tool on the other side. The link of the joint lever is pivoted to the piston rod of the control cylinder, which latter is pivoted, as a whole, on the opposite side.

Further features and advantages of the invention will be described in connection with the attached drawing showing schematically a preferred embodiment for the working cylinder of a punching and embossing machine with two-step action.

Figure 1:
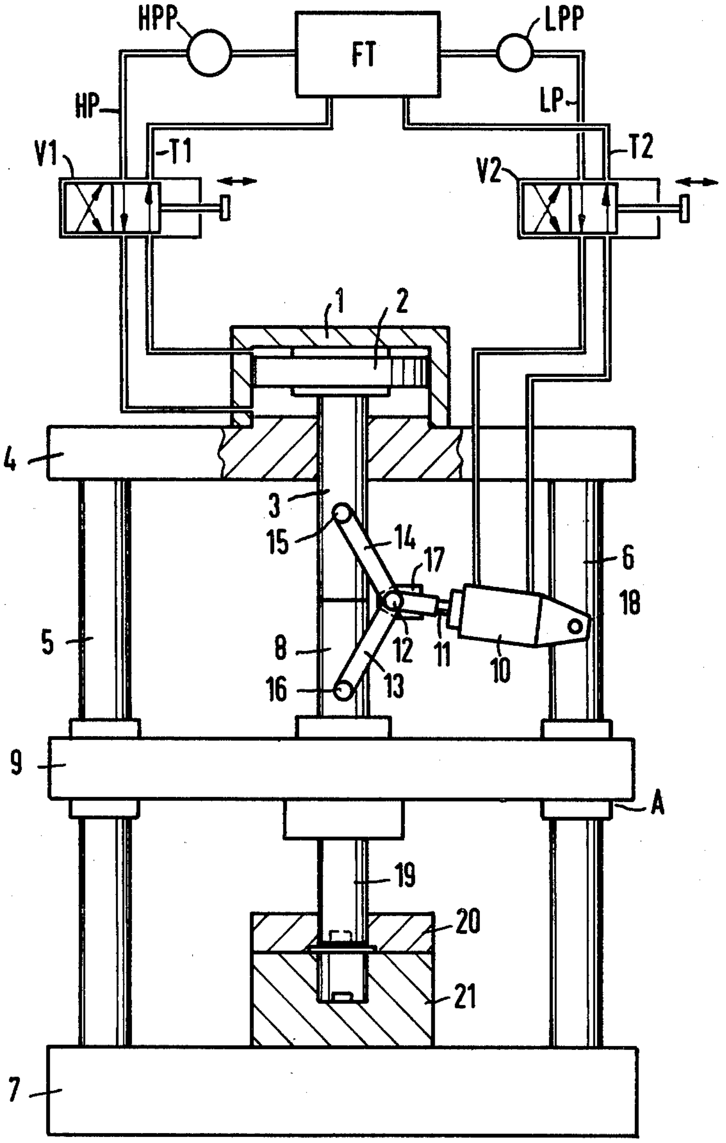
Figure 2:
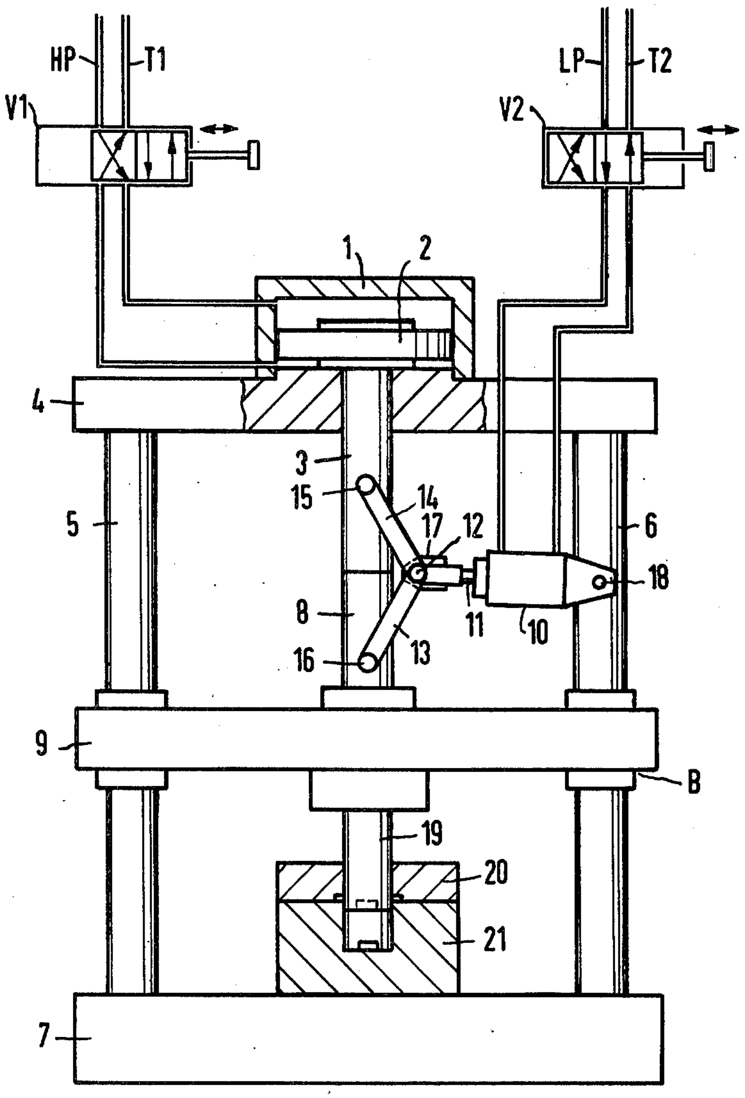
Figure 3:
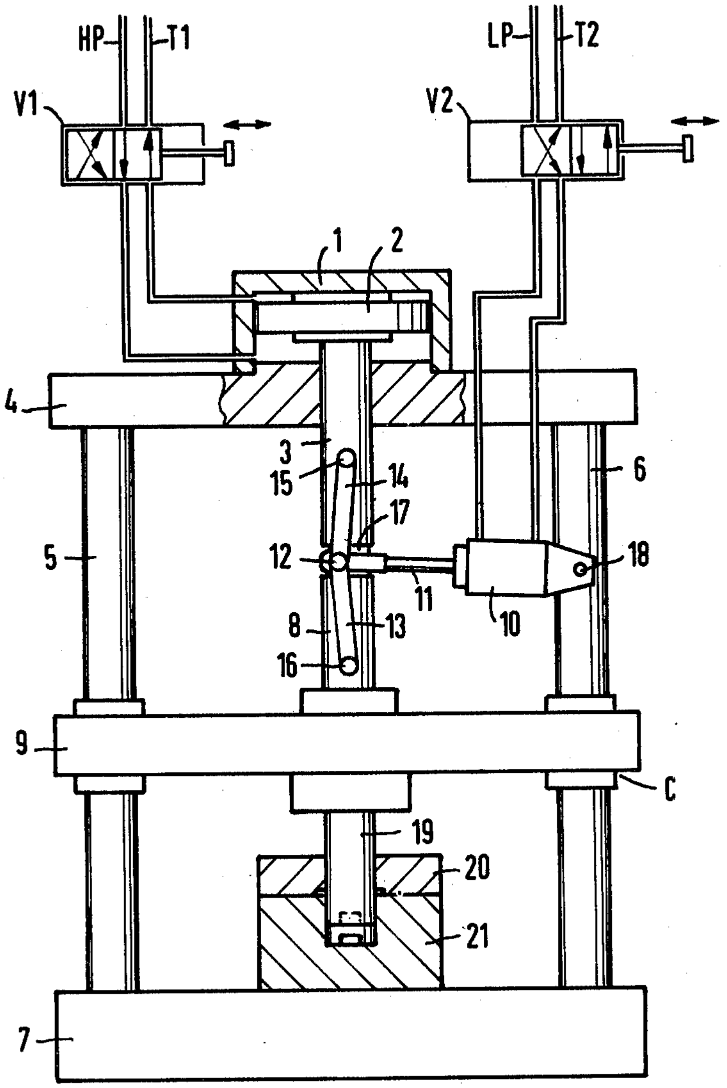
Figure 4:
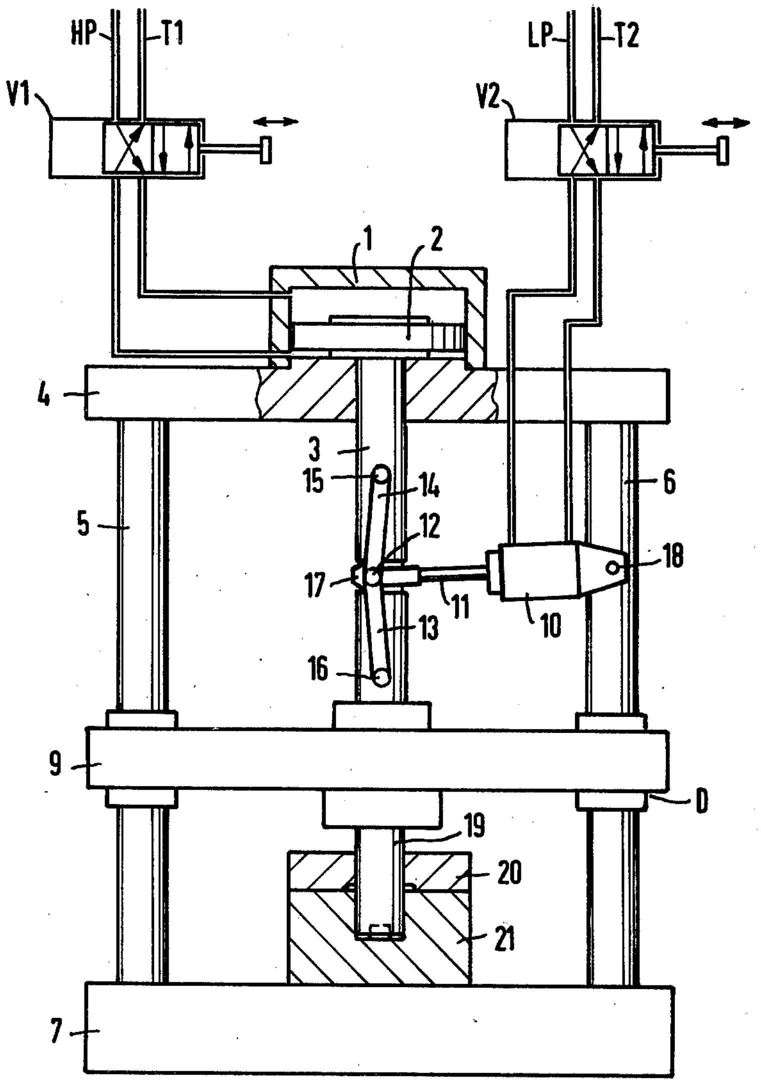

FIG. 1 shows the initial position A, FIG. 2 the final position B of the first stroke, FIGS. 3 and 4 the corresponding positions C and D for the second stroke.

Referring now to FIG. 1, there is shown a working cylinder 1 mounted to a frame plate 4, carried by the pillars 5 and 6 and the base plate 7. The cylinder 1 is provided with a piston 2 fixed to a piston rod 3. This rod 3 and a second rod 8 of equal diameter constitute the power transmission to the working plate 9 guided by the pillars 5 and 6. The working plate is to be moved downward in two consecutive steps in which the power stroke of the piston 2 remains unchanged as the initial position A is transferred to C independently of the power stroke.

This is accomplished by a control cylinder 10 acting by its piston rod 11 on the link 12 of the joint lever 13, 14, the ends of which are pivoted at 15 and 16 to the piston rod 3 and the rod 8, respectively. The link 12 also carries an intermediate or pressure member 17 which will be referred to later. The control cylinder 10 being as a whole pivoted at 18 to the pillar 6 of the frame to produce effective action of the joint lever 13, 14.

The working plate carries a punch 19 for a combined punching and embossing die 20, 21.

To actuate working and control cylinder there are provided a high pressure pump HPP and a low pressure pump LPP, respectively, with a common fluid tank FT. High pressure fluid is led to the working cylinder through a tube HP, a first reversing valve $V_1$ and a tube $T_1$ back to the tank FT. Low pressure fluid is led to the control cylinder through a tube LP, a second reversing valve $V_2$ and back through tube $T_2$. Both reversing valves are shown schematically with handles to reverse the fluid flow to the cylinders as indicated by arrows. The valves may also be actuated electromagnetically or by other suitable means. Hydraulic power and control equipment of this kind is, per se, well known in the art.

FIG. 1 shows the highest position A of the working plate. Both valves are in their left position, de-energized in case of electromagnetic actuation. Piston 2 is in the upper position, and the joint lever 13, 14 is in the bent position. The faces of piston rod 3 and rod 8 are in contact with each other. If now the valve $V_1$ is brought to its right position (energized), the tube HP is connected to the upper part of the working cylinder. The piston 2 performs its first power stroke and moves working table 9 from position A to B. Valve $V_2$ remains de-energized, which leaves control cylinder 10 in its initial position and the joint lever 13, 14 in its bent position.

To prepare the second power stroke (FIG. 3), valve $V_1$ is de-energized (returned to left) and the tube HP connected to the lower part of the working cylinder which results in the return of piston 2 into its upper position. Simultaneously, the valve $V_2$ is moved to the right and thus tube LP connected to the right part of the control cylinder. The latter will, therefore, move its piston to the left, and the member 17 enters the space between piston rod 3 and rod 8 while the joint lever 13, 14 attains its stretched position. When the working plate 9 has reached position C, member 17 has filled the space between rod 3 and 8, the opposite sides of member being in contact with rods 3 and 8 to ensure that the pressing force will be transmitted to the working plate 9.

As shown in FIG. 4, the valve $V_1$ is now brought to the right to again connect tube HP to the upper part of the working cylinder. This effects the second power stroke which will move the working plate 9 to position D.

To complete the cycle, the valves $V_1$ and $V_2$ are returned into the positions shown in FIG. 1. Thereupon piston 2, piston rod 3 and rod 8 will return to their initial positions ready for the next cycle.

As shown in the drawing by way of example, the first step from A to B is a punching operation, while during the second step C–D the cut workpiece is embossed. The invention is readily adaptable to other combined operations. It will be apparent that various modifications are possible with respect to the working fluid, the mechanical construction and the realisation of the control means used in practicing the invention.

What is claimed is:

1. A fluid pressure device, comprising (a) a working cylinder and piston for operating a working tool during each power stroke of said working piston;

(b) working piston control means for actuating said working piston;

(c) power transmission means for transmitting power from said working piston to said working tool comprising a pair of aligned movable members mounted for reciprocal movement, one of said members being operatively associated with said working piston for movement therewith, and lever means connected to said members for linking said members together, said lever means being operable to move said members into and out of contact with one another;

(d) lever control means for actuating said lever means in a two step cycle, the first step being to bring said members into contact with each other before a first power stroke and the second step being to bring said members out of contact with each other after said first power stroke and before the next successive power stroke, said lever means being operable independently of said working piston control means; and (e) said working piston control means being operable to actuate said working piston to perform said power stroke while said members are in contact with each other thus defining a first effective length of the power transmission and while said members are separated via said lever means thus defining a second effective length of the power transmission.

2. Apparatus according to claim 1, wherein said one member is a piston rod connected to the working piston and the other member is a rod having a working tool at its end remote from said piston rod, and said lever means includes a pair of levers pivotally connected to a common pivot at one of their ends with the free end of each being pivotally connected to one of said rods.

3. Apparatus according to claim 2, wherein said lever control means comprises a control cylinder and piston operatively connected to said pivot and operable to swing said levers about said pivot alternately moving said free ends away from and toward each other to separate and contact said rods, respectively.

4. Apparatus according to claim 3, wherein said control cylinder is mounted for pivotal movement at its end opposite the connection to said levers.

5. Apparatus according to claim 1, wherein said lever means includes an intermediate member adapted to be inserted between said aligned members when said aligned members are out of contact with one another with opposite sides of said intermediate member contacting said aligned members for transmitting pressure from the working piston to said working tool.

* * * * *